(12) United States Patent
Ferris et al.

(10) Patent No.: US 9,972,348 B1
(45) Date of Patent: May 15, 2018

(54) DATA STORAGE DEVICE EMPLOYING SMART BRAKING TO UNLOAD MULTIPLE VOICE COIL MOTORS

(71) Applicant: Western Digital Technologies, Inc., Irvine, CA (US)

(72) Inventors: Timothy A. Ferris, Mission Viejo, CA (US); Jaesoo Byoun, Irvine, CA (US); Brian K. Tanner, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 15/797,476

(22) Filed: Oct. 30, 2017

(51) Int. Cl.
*G11B 5/596* (2006.01)
*G11B 5/55* (2006.01)

(52) U.S. Cl.
CPC ............ *G11B 5/5565* (2013.01); *G11B 5/553* (2013.01)

(58) Field of Classification Search
CPC ..... G11B 27/36; G11B 5/012; G11B 2220/20; G11B 2220/90; G11B 27/11; G11B 5/6005; G11B 5/59633; G11B 5/54; G11B 5/5552; G11B 5/596; G11B 25/043; G11B 33/08

USPC .......... 360/75, 78.05, 69, 31, 97.12
See application file for complete search history.

(56) References Cited

U.S. PATENT DOCUMENTS

| | | |
|---|---|---|
| 6,121,742 A | 9/2000 | Misso |
| 6,577,465 B1 | 6/2003 | Bennett et al. |
| 6,847,504 B1 | 1/2005 | Bennett et al. |
| 6,934,135 B1 | 8/2005 | Ryan |
| 6,970,319 B1 | 11/2005 | Bennett et al. |
| 7,161,757 B1 * | 1/2007 | Krishnamoorthy .... G11B 19/20 360/69 |
| 7,548,392 B1 | 6/2009 | Desai et al. |
| 9,165,583 B1 | 10/2015 | Beker |

* cited by examiner

*Primary Examiner* — Nabil Hindi (57) ABSTRACT

A data storage device is disclosed comprising a first voice coil motor (VCM) comprising a first voice coil, and a second VCM comprising a second voice coil. The first VCM and the second VCM are unloaded during a power failure by measuring a first velocity and a first position of the first VCM and measuring a second velocity and a second position of the second VCM. A BEMF voltage generated by a spindle motor is used to generate a first brake voltage based on the first velocity and the first position, and the BEMF voltage is used to generate a second brake voltage based on the second velocity and the second position. The first brake voltage is applied to the first voice coil, and the second brake voltage is applied to the second voice coil.

21 Claims, 5 Drawing Sheets

| Brake Table | | Position | | | |
|---|---|---|---|---|---|
| | | OD | OMD | IMD | ID |
| Velocity | >>>> Target | -V1/T1 | -V2/T2 | -V3/T3 | -V3/T3 |
| | >>> Target | -V2/T2 | -V3/T3 | -V3/T3 | -V3/T3 |
| | >> Target | -V3/T3 | -V3/T3 | -V3/T3 | -V3/T3 |
| | ≈ Target | Skip | Skip | Skip | Skip |
| | ≈ 0 | V4/T4 | Skip | Skip | Skip |
| | ≈ -Target | V5/T4 | Skip | Skip | Skip |
| | >> -Target | V3/T3 | V3/T3 | V3/T3 | V3/T3 |
| | >>> -Target | V3/T3 | V3/T3 | V3/T3 | V2/T2 |
| | >>>> -Target | V3/T3 | V3/T3 | V2/T2 | V1/T1 |

DATA STORAGE DEVICE EMPLOYING SMART BRAKING TO UNLOAD MULTIPLE VOICE COIL MOTORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
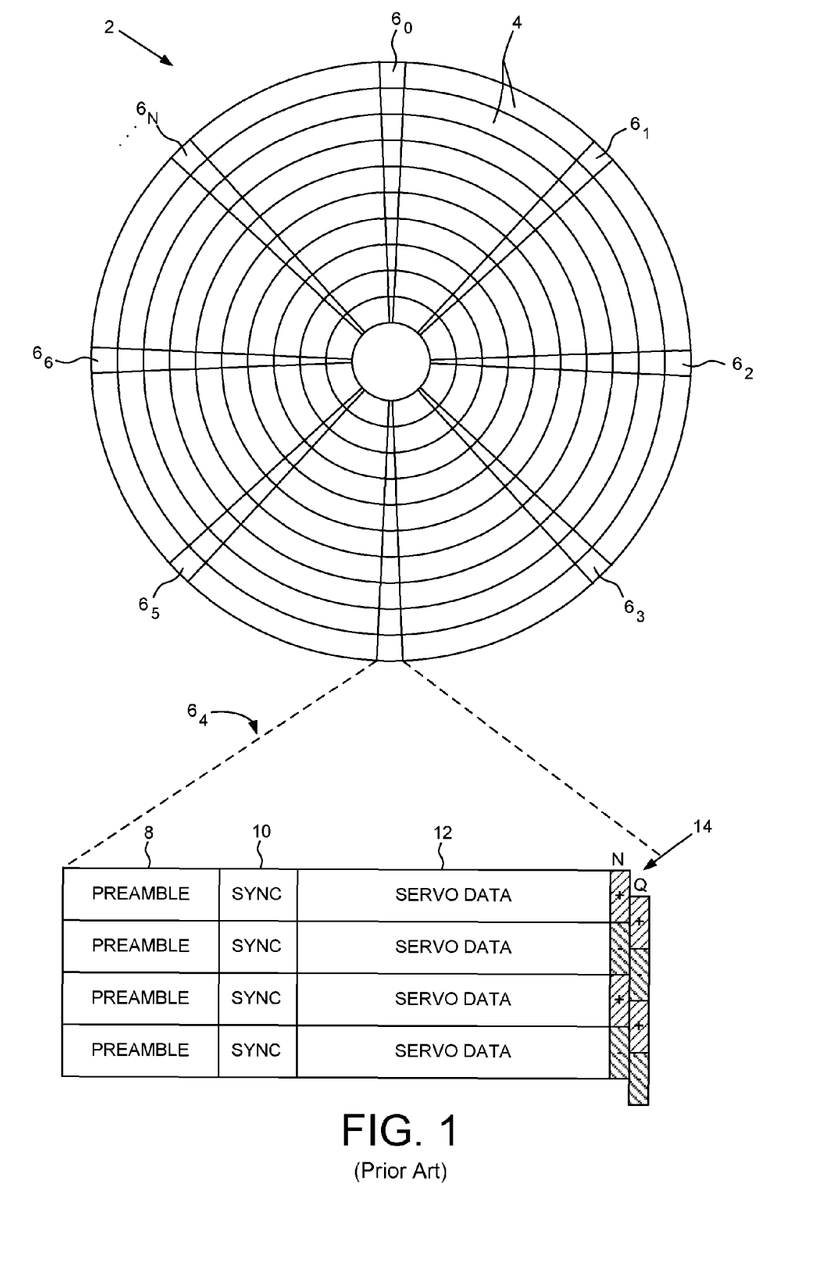
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B:
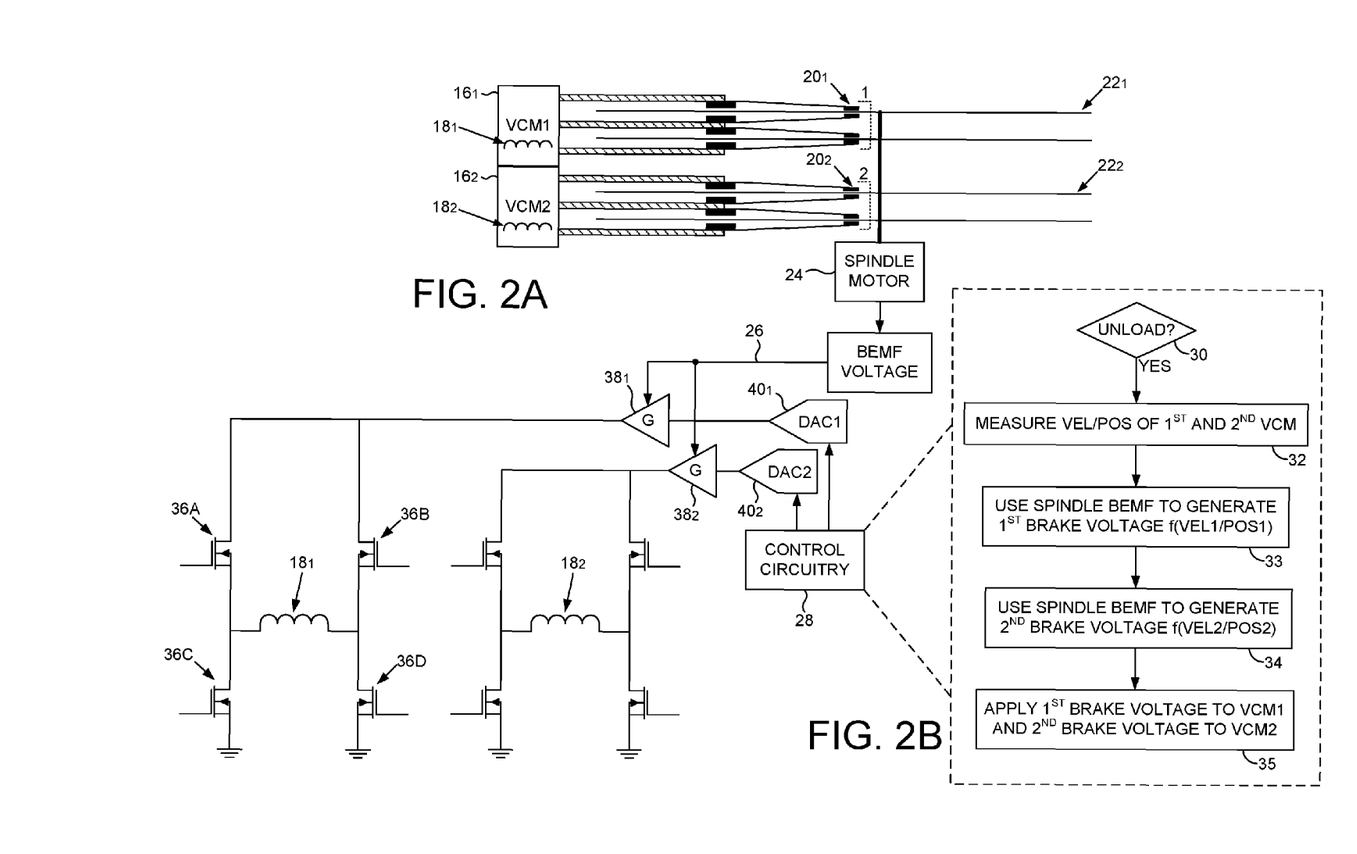
FIG. 2A shows a data storage device in the form of a disk drive according to an embodiment comprising a first head actuated over a first disk by a first VCM, and a second head actuated over a second disk by a second VCM, wherein the disks are rotated by a spindle motor configured to generate a back electromotive force (BEMF) voltage during a power failure.
FIG. 2B is a flow diagram according to an embodiment wherein during a power failure the VCMs are unloaded by applying different brake voltages (generated using the spindle BEMF voltage) to the respective VCMs based on the initial velocity and position of each VCM when the power failure occurs.

FIG. 2A shows a data storage device in the form of a disk drive according to an embodiment comprising a first voice coil motor (VCM) $16_1$ comprising a first voice coil $18_1$ configured to actuate a first head $20_1$ over a first disk $22_1$, and a second VCM $16_2$ comprising a second voice coil $18_2$ configured to actuate a second head $20_2$ over a second disk $22_2$. The disk drive further comprises a spindle motor 24 configured to rotate the first and second disk $22_1$ and $22_2$, wherein during a power failure the kinetic rotation of the first and second disks $22_1$ and $22_2$ causes the spindle motor to generate a back electromotive force (BEMF) voltage 26. Control circuitry 28 is configured to unload the first VCM and the second VCM during the power failure (block 30) by executing the flow diagram of FIG. 2B, wherein a first velocity and a first position of the first VCM and a second velocity and a second position of the second VCM are measured (block 32). The BEMF voltage is used to generate a first brake voltage based on the first velocity and the first position (block 33), and the BEMF voltage is used to generate a second brake voltage based on the second velocity and the second position (block 34). The first brake voltage is applied to the first voice coil, and the second brake voltage is applied to the second voice coil (block 35).

In one embodiment, the current sourced from the BEMF voltage of the spindle motor is limited which limits the amount of braking power available during a power failure. If the brake voltage simultaneously applied to both voice coils is capped to avoid exceeding the current limit of the BEMF voltage, the resulting braking power may not be sufficient to slow the heads before contacting a ramp at the outer diameter (OD) of the disk, which can eventually damage the heads after executing numerous unload operations. That is, if a power failure occurs while one of the heads is near the OD of the disk and moving at a high velocity toward the OD, a capped brake voltage may be insufficient to slow the head before contacting the ramp. Accordingly in one embodiment, applying a variable brake voltage based on the initial velocity and position of each VCM at the beginning of a power failure helps prevent damaging the heads by applying more braking power to a head that is at the OD of the disk and moving at a high velocity toward the ramp. In one embodiment, this reduces the number of times any one head contacts the ramp at an excessive velocity since it is statistically less likely that both heads will be at the OD and travelling at a high velocity toward the ramp at the beginning of a power failure.

In the embodiment of FIG. 2A, the first VCM $16_1$ and the second VCM $16_2$ rotate respective actuator arms about a common pivot in what may be referred to as a split actuator design. In another embodiment, the first VCM and the second VCM may be separated so as to rotate respective actuator arms about independent pivots. Also in the embodiment of FIG. 2A, the disk drive comprises four disks having respective heads actuated over top and bottom disk surfaces. Other embodiments may employ a different number of head/disk combinations, and still other embodiment may employ more than two VCMs for independent actuation of one or more heads.

In the embodiment of FIG. 2A, each voice coil $18_1$ and $18_2$ is driven by an H-bridge circuit comprising a plurality of switches (e.g., switches 36A, 36B, 36C and 36D). The switches are configured by the control circuitry 28 in order to rotate the VCM in on direction or the other, thereby actuating the respective heads toward the outer diameter or inner diameter of the disk. For example, when switches 36B and 36C are turned on and switches 36A and 36D are turned off, the VCM1 may be rotated so that the heads 1 move toward the outer diameter of the disk 22$_1$ toward a ramp (not shown). When a power failure occurs while the disks are spinning, the kinetic energy of the spinning disks can convert the spindle motor 24 into a power generator used to power the VCM H-bridge circuits using the BEMF voltage that builds across the windings of the spindle motor 24.

Figure 3:
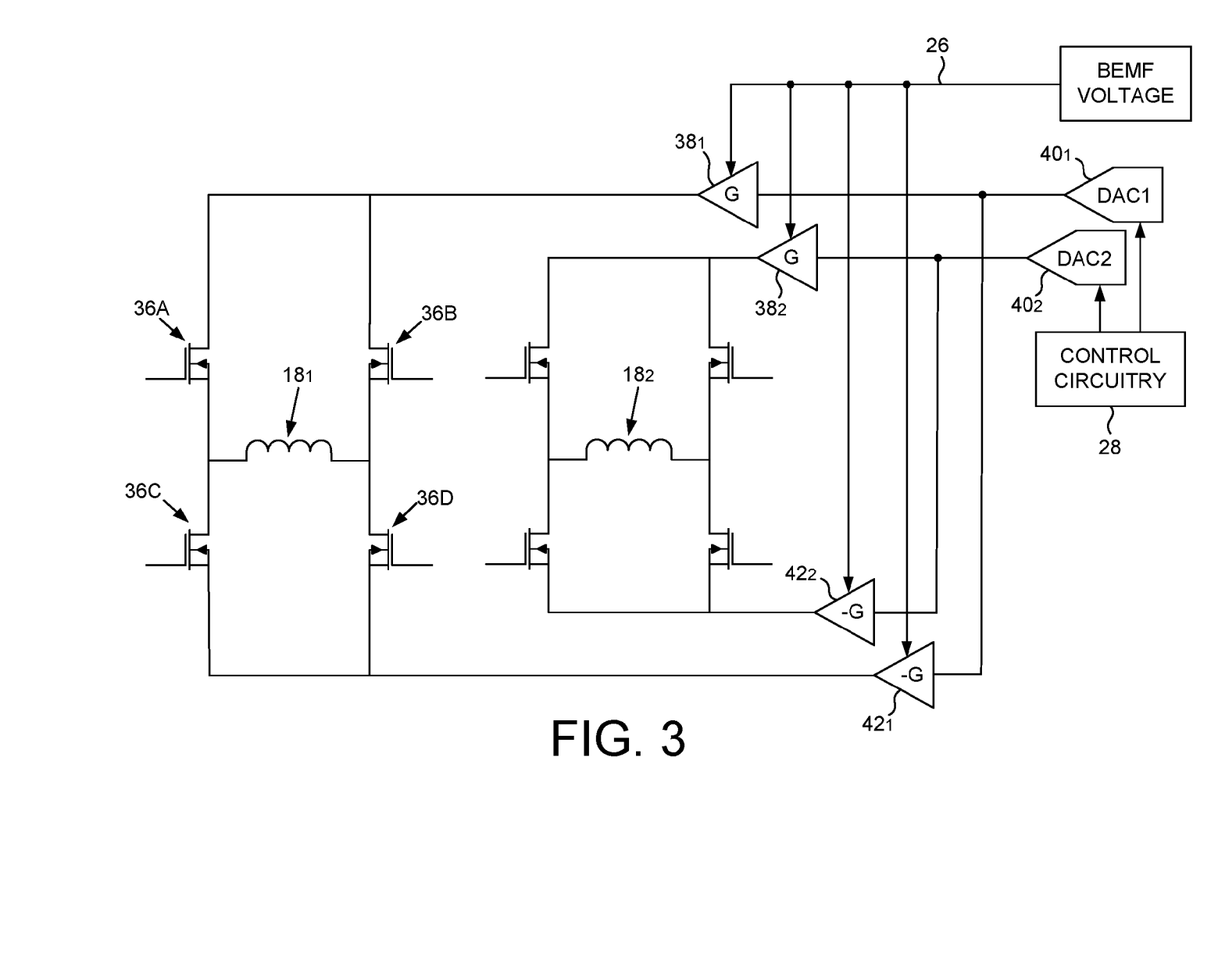
FIG. 3 shows an embodiment wherein the brake voltage is applied to each VCM as a differential voltage using a non-inverting and inverting amplifier.

In the embodiment of FIG. 2A, the brake voltage is applied to each voice coil using respective non-inverting amplifiers 38$_1$ and 38$_2$ powered by the BEMF voltage 26. The control circuitry 28 loads digital values representing the brake voltage for each VCM into respective digital-to-analog converters (DACs) 40$_1$ and 40$_2$ which convert the digital values to analog values applied to the non-inverting amplifiers 38$_1$ and 38$_2$. FIG. 3 shows an embodiment wherein the brake voltage may be applied to each voice coil as a differential voltage by connecting the low side switches of the H-bridge circuits to inverting amplifiers 42$_1$ and 42$_2$ powered by the BEMF voltage 26.

Figure 4:
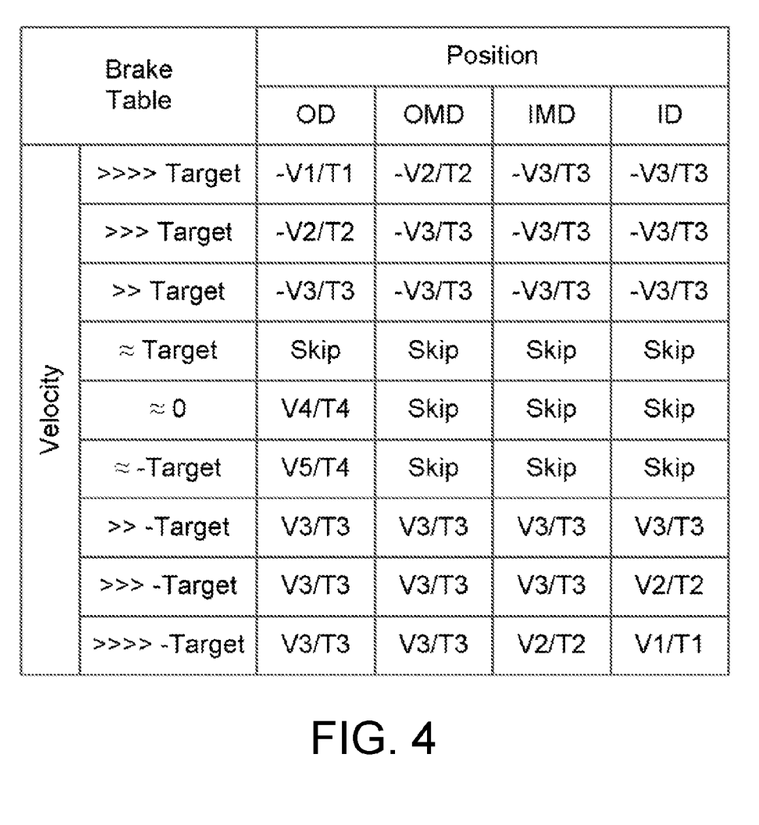
FIG. 4 show a lookup table according to an embodiment wherein a brake voltage and brake interval are selected for each VCM based on the velocity and position of each VCM.

FIG. 4 shows a table according to an embodiment wherein the initial velocity and position of each VCM at the beginning of a power failure are used to lookup a corresponding brake voltage and brake interval. The brake voltage is applied to the voice coil for the brake interval in order to brake each VCM with a braking energy that is based on the amplitude of the brake voltage and the duration of the brake interval. In the embodiment of FIG. 4, the relationship between the brake voltages is:

$$V1 > V2 > V3 > V4 \text{ and } V5 \approx 2*V4$$

A stronger brake power is applied to the VCM by applying a higher brake voltage (applying a higher percentage of the BEMF voltage) when the head is traveling at a higher velocity toward the OD of the disk. This is illustrated in the table of FIG. 4 wherein the brake voltage is the highest (−V1) when the head is traveling much faster than a target velocity toward the OD of the disk, and the initial position of the head at the beginning of the power failure is also near the OD of the disk. When the head is further away from the ramp (within an outer to middle diameter (OMD) band) or at a lower initial velocity toward the ramp, the brake voltage is reduced to −V2, and yet further reduced to −V3 when the head is within an inner to middle diameter (IMD) band or within an inner diameter (ID) band or when the initial velocity toward the ramp is lower. As described above, this embodiment enables a higher brake voltage to be applied to one of the VCMs to decrease the head/ramp contact velocity toward a target velocity without exceeding the current limit of the BEMF voltage 26.

In one embodiment when both VCMs require a high brake voltage (e.g., brake voltage −V1) the high brake voltage may be applied to both VCMs, but the brake current is reduced due to the limited current sourcing of the BEMF voltage. The reduction in brake current decreases the braking power applied to one or both of the VCMs which may cause one or both of the heads to contact the ramp at an excessive velocity. However since the probability that both VCMs will require a high brake voltage during a power failure is relatively low, the number of head/ramp contacts at excessive velocity is reduced.

In one embodiment, the disk drive may comprise an ID crash stop implemented as a tab (not shown) extending from the voice coil housing which contacts a physical barrier, thereby limiting the stroke of the VCM to prevent the head from crashing into the disk clamp at the ID of the disk. In one embodiment illustrated in FIG. 4, the brake voltage may be increased to prevent damage to the head due to the VCM contacting the ID crash stop at a high speed during a power failure. That is, a high brake voltage (e.g., V1) may be applied to the VCM when the head is near the ID of the disk and moving at a high speed toward the ID. As the initial position of the head is further away from the ID or the initial velocity is lower when a power failure occurs, the brake voltage applied to the VCM may be reduced as illustrated in FIG. 4. In one embodiment, one or both the amplitude of the brake voltage and the brake interval may be generated by interpolating the values shown in FIG. 4 for an initial velocity and/or position of the VCM that is between the values shown in the table.

In the table of FIG. 4, any suitable combination of brake voltage (percentage of the BEMF voltage) and brake interval may be configured to brake the VCMs during a power failure. In one embodiment, the amplitude of the brake voltage and the brake interval for applying the brake voltage may be selected to ensure the velocity of the head is sufficiently reduced before contacting the ramp, or before the VCM contacts the ID crash stop. In one embodiment, if the head is moving at a high velocity toward the ramp and the initial position is near the ramp, a high amplitude brake voltage is applied for a short interval to ensure the velocity of the head is sufficiently reduced before contacting the ramp. That is, in one embodiment the interval for applying the brake voltage may be limited by the amount of time available to brake the VCM before there is contact with the ramp or the ID crash stop. When the initial velocity of the head is low and/or the position of the head is not near the ramp or ID of the disk, a lower amplitude brake voltage may be applied over a longer interval in order to reduce the peak current consumption of the corresponding VCM, as well as prevent the peak current consumption of both VCMs from exceeding the current limit of the BEMF voltage.

In one embodiment, the amplitude of the brake voltages and the duration of the brake intervals shown in FIG. 4 may be determined theoretically by evaluating known parameters of each VCM, or they may be determined empirically by evaluating a subset of production disk drives over a number of different unload scenarios using different amplitude brake voltages and brake intervals. In yet another embodiment, the amplitude of the brake voltage and/or the brake intervals may be calibrated by each production disk drive by executing a suitable calibration procedure during manufacturing and/or while deployed in the field. In another embodiment, the amplitude of the brake voltage and/or the brake interval may be adjusted as needed if excessive velocity contact with the ramp or ID crash stop is detected during the power failure unload operations.

Figure 5:
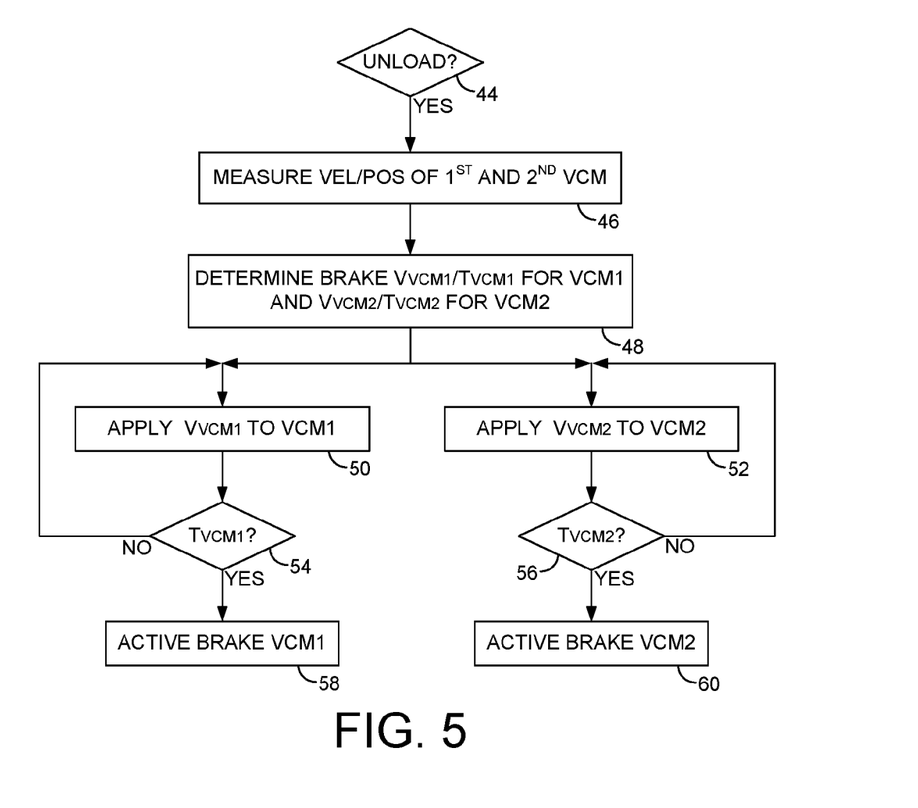
FIG. 5 is a flow diagram according to an embodiment wherein the brake voltage is applied to each VCM for the respective brake interval open loop, and then each VCM is undergoes an active braking using closed loop control.

FIG. 5 is a flow diagram according to an embodiment wherein when executing an unload operation (block 44) during a power failure, an initial velocity and position of each VCM is measured (block 46). A brake voltage and brake interval are determined based on the initial velocity and position of each VCM (block 48). The brake voltage $V_{VCM1}$ is applied to the first VCM (block 50) and the brake voltage $V_{VCM2}$ is concurrently applied to the second VCM (block 52). The brake voltage $V_{VCM1}$ is applied to the first VCM over the brake interval $T_{VCM1}$ (block 54), and the brake voltage $V_{VCM2}$ is applied to the second VCM over the brake interval $T_{VCM2}$ (block 56). In one embodiment, the first brake interval $T_{VCM1}$ may differ in duration from the second brake interval $T_{VCM2}$, wherein both brake intervals at least partially overlap during which time the brake voltage is applied concurrently to both VCMs. At the end of the first interval $T_{VCM1}$, the control circuitry transitions into an active brake mode (block 58), wherein braking of the first VCM is controlled closed loop with the measured velocity of the first VCM as feedback. At the end of the second interval $T_{VCM2}$, the control circuitry transitions into an active brake mode (block 60), wherein braking of the second VCM is controlled closed loop with the measured velocity of the second VCM as feedback. At the end of the active brake mode, the control circuitry may transition into a servo control mode wherein the velocity of each VCM may be maintained at a target velocity using the measured velocity as feedback.

In the above-described embodiments, a power failure may be detected in any suitable manner, such as by detecting when a supply voltage received from a host falls below a predetermined threshold. In one embodiment, a power failure may be detected when the supply voltage remains below the threshold for a predetermined interval in order to filter out transients in the supply voltage not due to a power failure. The control circuitry 28 may implement any suitable servo control algorithm in order to execute the unload operation during a power failure. For example, the control circuitry 28 may implement a suitable proportional control, proportional-integral control, or proportional-integral-derivative control. In addition, the control circuitry 28 may change the control algorithm at different intervals of the unload operation, for example, by employing a proportional control while accelerating the VCMs toward a target velocity at the beginning of the unload operation, and then employing a proportional-integral control to maintain the VCMs at the target velocity until the heads are unloaded onto the ramp.

In the above-described embodiments, the initial velocity and position of each VCM may be measured in any suitable manner at the beginning of a power failure. In one embodiment, the control circuitry may comprise a suitable servo control system for actuating the head over the disk during normal access operations, wherein the servo control algorithm may involve measuring the velocity and/or position of each VCM based on servo sectors recorded on each disk surface. When a power failure occurs, the control circuitry may evaluate the servo control states (velocity and/or position) in order to determine the initial velocity and/or position of each VCM. In another embodiment, when a power failure occurs the control circuitry may measure the velocity of each VCM by evaluating the amplitude of a BEMF voltage across each voice coil which is typically proportional to the VCM velocity.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry may comprise a disk controller responsible for implementing the servo control algorithm used to actuate each head over their respective disk surface during access operations. When a power failure occurs, in one embodiment the disk controller may transmit the state information (velocity and position) of each VCM to a power integrated circuit responsible for braking the VCMs as described above. In another embodiment, the control circuitry may comprise a separate disk controller for controlling a respective VCM during normal access operations, and a separate power integrated circuit for braking a respective VCM during a power failure.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
 a first voice coil motor (VCM) comprising a first voice coil configured to actuate a first head over a first disk;
 a second VCM comprising a second voice coil configured to actuate a second head over a second disk;
 a spindle motor configured to rotate the first and second disk, wherein during a power failure the first and second disks rotating causes the spindle motor to generate a back electromotive force (BEMF) voltage; and
 control circuitry configured to unload the first VCM and the second VCM during the power failure by at least:
  measuring a first velocity and a first position of the first VCM;
  measuring a second velocity and a second position of the second VCM;
  using the BEMF voltage to generate a first brake voltage based on the first velocity and the first position;
  using the BEMF voltage to generate a second brake voltage based on the second velocity and the second position; and
  applying the first brake voltage to the first voice coil and applying the second brake voltage to the second voice coil.

2. The data storage device as recited in claim 1, wherein:
 the first brake voltage is higher when the first velocity moves the first head toward an outer diameter of the first disk and the first position is proximate to the outer diameter of the first disk; and
 the second brake voltage is higher when the second velocity moves the second head toward an outer diameter of the second disk and the second position is proximate to the outer diameter of the second disk.

3. The data storage device as recited in claim 2, wherein:
 the first brake voltage increases as the first velocity increases; and
 the second brake voltage increases as the second velocity increases.

4. The data storage device as recited in claim 1, wherein:
 the first brake voltage is higher when the first velocity moves the first head toward an inner diameter of the first disk and the first position is proximate to the inner diameter of the first disk; and
 the second brake voltage is higher when the second velocity moves the second head toward an inner diameter of the second disk and the second position is proximate to the inner diameter of the second disk.

5. The data storage device as recited in claim 4, wherein:
 the first brake voltage increases as the first velocity increases; and
 the second brake voltage increases as the second velocity increases.

6. The data storage device as recited in claim 1, wherein the control circuitry is further configured to unload the first VCM and the second VCM during the power failure by:
 applying the first brake voltage to the first voice coil over a first interval, wherein the first interval is based on the first velocity and the first position; and
 applying the second brake voltage to the second voice coil over a second interval different in duration than the first interval, wherein the second interval is based on the second velocity and the second position.

7. The data storage device as recited in claim 6, wherein the first and second intervals at least partially overlap.

8. A method of operating a data storage device, the method comprising:
 during a power failure, unloading a first voice coil motor (VCM) configured to actuate a first head over a first disk and a second VCM configured to actuate a second head over a second disk, the unloading comprising:
  measuring a first velocity and a first position of the first VCM;
  measuring a second velocity and a second position of the second VCM;
  using a BEMF voltage generated by a spindle motor to generate a first brake voltage based on the first velocity and the first position;
  using the BEMF voltage to generate a second brake voltage based on the second velocity and the second position; and
  applying the first brake voltage to a first voice coil of the first VCM and applying the second brake voltage to a second voice coil of the second VCM.

9. The method as recited in claim 8, wherein:
 the first brake voltage is higher when the first velocity moves the first head toward an outer diameter of the first disk and the first position is proximate to the outer diameter of the first disk; and
 the second brake voltage is higher when the second velocity moves the second head toward an outer diameter of the second disk and the second position is proximate to the outer diameter of the second disk.

10. The method as recited in claim 9, wherein:
 the first brake voltage increases as the first velocity increases; and
 the second brake voltage increases as the second velocity increases.

11. The method as recited in claim 8, wherein:
 the first brake voltage is higher when the first velocity moves the first head toward an inner diameter of the first disk and the first position is proximate to the inner diameter of the first disk; and
 the second brake voltage is higher when the second velocity moves the second head toward an inner diameter of the second disk and the second position is proximate to the inner diameter of the second disk.

12. The method as recited in claim 11, wherein:
 the first brake voltage increases as the first velocity increases; and
 the second brake voltage increases as the second velocity increases.

13. The method as recited in claim 8, further comprising unloading the first VCM and the second VCM during the power failure by:
 applying the first brake voltage to the first voice coil over a first interval, wherein the first interval is based on the first velocity and the first position; and
 applying the second brake voltage to the second voice coil over a second interval different in duration than the first interval, wherein the second interval is based on the second velocity and the second position.

14. The method as recited in claim 13, wherein the first and second intervals at least partially overlap.

15. Control circuitry for use in a data storage device, wherein during a power failure the control circuitry configured to unload a first voice coil motor (VCM) configured to actuate a first head over a first disk and a second VCM configured to actuate a second head over a second disk by at least:

measuring a first velocity and a first position of the first VCM;

measuring a second velocity and a second position of the second VCM;

using a BEMF voltage generated by a spindle motor to generate a first brake voltage based on the first velocity and the first position;

using the BEMF voltage to generate a second brake voltage based on the second velocity and the second position; and applying the first brake voltage to a first voice coil of the first VCM and applying the second brake voltage to a second voice coil of the second VCM.

16. The control circuitry as recited in claim 15, wherein:

the first brake voltage is higher when the first velocity moves the first head toward an outer diameter of the first disk and the first position is proximate to the outer diameter of the first disk; and the second brake voltage is higher when the second velocity moves the second head toward an outer diameter of the second disk and the second position is proximate to the outer diameter of the second disk.

17. The control circuitry as recited in claim 16, wherein:

the first brake voltage increases as the first velocity increases; and the second brake voltage increases as the second velocity increases.

18. The control circuitry as recited in claim 15, wherein:

the first brake voltage is higher when the first velocity moves the first head toward an inner diameter of the first disk and the first position is proximate to the inner diameter of the first disk; and the second brake voltage is higher when the second velocity moves the second head toward an inner diameter of the second disk and the second position is proximate to the inner diameter of the second disk.

19. The control circuitry as recited in claim 18, wherein:

the first brake voltage increases as the first velocity increases; and the second brake voltage increases as the second velocity increases.

20. The control circuitry as recited in claim 15, wherein the control circuitry is further configured to unload the first VCM and the second VCM during the power failure by:

applying the first brake voltage to the first voice coil over a first interval, wherein the first interval is based on the first velocity and the first position; and applying the second brake voltage to the second voice coil over a second interval different in duration than the first interval, wherein the second interval is based on the second velocity and the second position.

21. The control circuitry as recited in claim 20, wherein the first and second intervals at least partially overlap.

* * * * *